United States Patent [19]

Takagishi et al.

[11] Patent Number: 6,114,432

[45] Date of Patent: *Sep. 5, 2000

[54] DIENE RUBBER COMPOSITION

[75] Inventors: Yukio Takagishi; Masao Nakamura, both of Kanagawa, Japan

[73] Assignee: Nippon Zeon Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/913,819

[22] PCT Filed: Mar. 29, 1996

[86] PCT No.: PCT/JP96/00856

§ 371 Date: Sep. 24, 1997

§ 102(e) Date: Sep. 24, 1997

[87] PCT Pub. No.: WO96/30444

PCT Pub. Date: Oct. 3, 1996

[30] Foreign Application Priority Data

Mar. 29, 1996 [JP] Japan ................... 7-097947

[51] Int. Cl.⁷ ................................................. C08K 3/40
[52] U.S. Cl. ................................ 524/494; 523/213
[58] Field of Search ............................ 524/494; 523/213

[56] References Cited

U.S. PATENT DOCUMENTS

| 4,299,932 | 11/1981 | Hergenrother | 525/333.2 |
|---|---|---|---|
| 4,430,466 | 2/1984 | Cooper | 523/213 |
| 4,780,507 | 10/1988 | Gaku | 525/331.9 |
| 4,894,409 | 1/1990 | Shimada et al. | |
| 5,409,969 | 4/1995 | Hamada | |
| 5,616,639 | 4/1997 | Lucas | 524/493 |
| 5,708,053 | 1/1998 | Jalics | 523/213 |
| 5,723,529 | 3/1998 | Bernard | 524/493 |

FOREIGN PATENT DOCUMENTS

| 188501 | of 0000 | Japan . |
|---|---|---|
| 5230286 | of 0000 | Japan . |
| 61-130355 | of 0000 | Japan . |
| 61-130356 | of 0000 | Japan . |
| 61-215538 | 9/1986 | Japan . |
| 64-22940 | 1/1989 | Japan . |
| 1-101344 | 4/1989 | Japan . |
| 3-252431 | 11/1991 | Japan . |
| 3-252433 | 11/1991 | Japan . |

*Primary Examiner*—Paul R. Michl
*Attorney, Agent, or Firm*—Armstrong, Westerman, Hattori, McLeland & Naughton

[57] ABSTRACT

Disclosed herein are a diene rubber composition comprising 100 parts by weight of a diene rubber component composed of 10–100 wt. % of an amino group-containing diene copolymer rubber (A) having a composition (based on the bound amount) of 40–99.95 wt. % of a conjugated diene monomer, 0.05–20 wt. % of an amino group-containing monomer and 0–55 wt. % of an aromatic vinyl monomer, and 0–90 wt. % of another diene rubber (B), and 10–150 parts by weight of silica having a specific surface area of 50–220 $m^2/g$ as determined by nitrogen absorption (BET method), and having excellent heat build-up resistance, tensile properties, abrasion properties and processability, and a preparation method thereof.

19 Claims, No Drawings

DIENE RUBBER COMPOSITION

TECHNICAL FIELD

The present invention relates to rubber compositions obtained by compounding silica as a reinforcing agent into a diene rubber, and more particularly to rubber compositions, which are excellent in heat build-up resistance and moreover superb in tensile properties, abrasion properties and processability.

BACKGROUND ART

As much importance has been attached to saving in resources and countermeasures to environment in recent years, requirements to reduce fuel consumption of automobiles have been increasingly severe. Automobile tires have also been required to low their rolling resistance so as to contribute to reduction in the fuel consumption. In order to low the rolling resistance of tires, a rubber material capable of providing vulcanized rubber having low heat build-up is generally used as a rubber material for the tires.

It has heretofore been proposed to use a rubber composition obtained by compounding silica as a reinforcing agent with a diene rubber in place of carbon black so as to reduce heat build-up. However, the silica-compounded rubber composition has involved a problem that it cannot exhibit sufficient abrasion resistance and tensile strength compared with the carbon black-compounded rubber composition. A cause for this problem is considered to be attributed to the fact that the affinity of the silica for the diene rubber is lower than that of the carbon black, so that a reinforcing effect cannot be sufficiently developed.

In order to enhance the affinity of the silica for the diene rubber, it has heretofore been proposed to use a silane coupling agent (Japanese Patent Application Laid-Open Nos. 252431/1991 and 252433/1991, etc.). However, this method requires to use an expensive silane coupling agent in a large amount for bringing about a sufficient effect.

The use of a diene rubber with a substituent having high affinity for silica introduced therein has been investigated as another improving method. For example, a diene rubber with a tertiary amino group (Japanese Patent Application Laid-Open No. 101344/1989) introduced therein has been proposed for a diene rubber obtained by an emulsion polymerization process. Besides, a diene rubber with an alkylsilyl group (Japanese Patent Application Laid-Open No. 188501/1989), a halogenated silyl group (Japanese Patent Application Laid-Open No. 230286/1993) or a substituted amino group (Japanese Patent Application Laid-Open No. 22940/1989) introduced therein has been proposed for a diene rubber obtained by an anionic polymerization process.

However, many of the diene rubbers with these substituents introduced therein have demerits that when silica is blended with these diene rubbers, they strongly aggregate with silica to form compounds having a high Mooney viscosity, so that the resulting diene rubber compositions become poor in processability because a failure in dispersion occurs, and that the various properties of the diene rubber, such as heat build-up resistance, tensile strength and abrasion resistance, are not sufficiently improved.

DISCLOSURE OF THE INVENTION

It is an object of the present invention to provide a diene rubber composition which comprises a diene rubber component and silica, has good processability and is excellent in various properties such as heat build-up resistance, tensile strength and abrasion resistance.

The present inventors have carried out an extensive investigation with a view toward overcoming the above-described problems involved in the prior art. As a result, it has been found that when silica having a specified specific surface area as determined by nitrogen absorption is compounded with a specified diene copolymer rubber having an amino group, a diene rubber composition in which the Mooney viscosity of the resultant compound does not become too high, and so the resulting diene rubber composition has good processability can be provided. This diene rubber composition exhibits low heat build-up and is hence excellent in heat build-up resistance which is taken as an index to rolling resistance. The diene rubber composition exhibits tensile strength and abrasion resistance equal to or higher than those of a carbon black-compounded rubber composition. Although the amino group-containing diene copolymer rubber may be used singly as a diene rubber component, it may be used as a blend with other diene rubbers as needed. The present invention has been led to completion on the basis of these findings.

According to the present invention, there is thus provided a diene rubber composition comprising 100 parts by weight of a diene rubber component composed of 10–100 wt. % of an amino group-containing diene copolymer rubber (A) having a composition (based on the bound amount) of 40–99.95 wt. % of a conjugated diene monomer, 0.05–20 wt. % of an amino group-containing monomer and 0–55 wt. % of an aromatic vinyl monomer, 0–90 wt. % of another diene rubber (B), and 10–150 parts by weight of silica having a specific surface area of 50–220 $m^2/g$ as determined by nitrogen absorption (BET method) and a silane coupling agent in a proportion of 2–10 parts by weight per 100 parts by weight of the silica.

BEST MODE FOR CARRYING OUT THE INVENTION

The present invention will hereinafter be described in detail.

Amino group-containing diene copolymer rubber (A):

In the present invention, an amino group-containing diene copolymer rubber (A) having a composition (based on the bound amount) of 40–99.95 wt. % of a conjugated diene monomer, 0.05–20 wt. % of an amino group-containing monomer and 0–55 wt. % of an aromatic vinyl monomer is used simply, or the amino group-containing copolymer rubber (A) and another diene rubber (B) are used in combination.

The Mooney viscosity ($ML_{1+4}$, 100° C.) of the amino group-containing diene copolymer rubber used in the present invention is generally within a range of 20–150, preferably 25–100, more preferably 30–80. If the Mooney viscosity is too low, it is difficult to provide any diene rubber composition having sufficient heat build-up resistance and abrasion resistance. If the Mooney viscosity is too high on the other hand, the Mooney viscosity of the compound becomes too high, whereby the processability of the resulting rubber composition is deteriorated.

A copolymer of an amino group-containing vinyl monomer and a conjugated diene monomer, or a copolymer of an amino group-containing vinyl monomer, a conjugated diene monomer and an aromatic vinyl monomer may be used as the amino group-containing diene copolymer rubber. Contents (based on the bound amount in the copolymer) of the respective monomer units in the copolymer are suitably selected according to properties required of the resulting diene rubber composition. The content of the amino group-containing vinyl monomer is within a range of 0.05–20 wt.

%, preferably 0.1–15 wt. %, more preferably 0.2–10 wt. %. The content of the conjugated diene monomer is within a range of 40–99.95 wt. %, preferably 50–80 wt. %, more preferably 55–80 wt. %. The content of the aromatic vinyl monomer is within a range of 0–55 wt. %, preferably 5–45 wt. %, more preferably 10–40 wt. %. If the content of the amino group-containing vinyl monomer unit is too low, it is difficult to achieve a sufficient improving effect. If the content is too high on the other hand, the dispersion of silica in the resultant copolymer rubber becomes poor, so that a balance between processability and rebound resilience in the resulting diene rubber composition is deteriorated. Therefore, such too low and too high contents of the amino group-containing vinyl monomer unit are both not preferred. Besides, if the content of the aromatic vinyl monomer unit is too high, a balance between wet skid resistance and rebound resilience in the resulting diene rubber composition is deteriorated. Therefore, such a too high content of the aromatic vinyl monomer unit is not preferred.

Examples of the conjugated diene monomer used in the present invention include 1,3-butadiene, 2-methyl-1,3-butadiene, 2,3-dimethyl-1,3-butadiene, 2-chloro-1,3-butadiene, 1,3-pentadiene. Of these, 1,3-butadiene and 2-methyl-1,3-butadiene are preferred, with 1,3-butadiene being particularly preferred.

Examples of the aromatic vinyl monomer used in the present invention include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferred.

The amino group-containing vinyl monomer used in the present invention includes a polymerizable monomer having at least one primary, secondary or tertiary amino group in its molecule. The amino group in the amino group-containing vinyl monomer may be any of primary, secondary and tertiary amino groups. However, the tertiary amino group is preferred for achieving effects of improving heat build-up resistance, abrasion resistance, tensile strength and the like at a higher level. Examples of such an amino group-containing vinyl monomer include aminoalkyl acrylates, aminoalkylacrylamides, amino-aromatic vinyl compounds and vinyl compounds having a nitrogen-containing heterocycle.

Examples of primary amino group-containing vinyl monomers include acrylamide, methacrylamide, p-aminostyrene, aminomethyl (meth)acrylate, aminoethyl (meth)acrylate, aminopropyl (meth)acrylate and aminobutyl (meth)acrylate.

Examples of secondary amino group-containing vinyl monomers include anilinostyrenes disclosed in Japanese Patent Application Laid-Open No. 130355/1986; anilinophenylbutadienes disclosed in Japanese Patent Application Laid-Open No. 130356/1986; and N-monosubstituted (meth)acrylamides such as methyl (meth)acrylamide, ethyl (meth)acrylamide, N-methylolacrylamide and N-(4-anilinophenyl)methacrylamide.

Examples of tertiary amino group-containing vinyl monomers include N-disubstituted aminoalkyl acrylate, N-disubstituted aminoalkylacrylamide, N-disubstituted amino-aromatic vinyl compounds and pyridyl group-containing vinyl compounds.

Examples of the N-disubstituted aminoalkyl acrylates include dimethylaminomethyl (meth)acrylate, dimethylaminoethyl (meth)acrylate, dimethylaminopropyl (meth) acrylate, dimethylaminobutyl (meth)acrylate, diethylaminoethyl (meth)acrylate, diethylaminopropyl (meth)acrylate, diethylaminobutyl (meth)acrylate, methylethylaminoethyl (meth)acrylate, dipropylaminoethyl (meth)acrylate, dibutylaminoethyl (meth)acrylate, dibutylaminopropyl (meth) acrylate, dibutylaminobutyl (meth)acrylate, dihexylaminoethyl (meth)acrylate, dioctylaminoethyl (meth)acrylate and acryloylmorpholine. Of these, acrylic or methacrylic esters such as dimethylaminomethyl (meth)acrylate, diethylaminoethyl (meth)acrylate, dipropylaminoethyl (meth)acrylate, dioctylaminoethyl (meth)acrylate and methylethylaminoethyl (meth)acrylate are preferred.

Examples of the N-disubstituted aminoalkylacrylamides include acrylamide compounds such as dimethylaminomethyl(meth)acrylamide, dimethylaminoethyl(meth)acrylamide, dimethylaminopropyl(meth)acrylamide, dimethylaminobutyl(meth)acrylamide, diethylaminoethyl (meth)acrylamide, diethylaminopropyl(meth)acrylamide, diethylaminobutyl(meth)acrylamide, methylethylaminoethyl(meth)acrylamide, dipropylaminoethyl(meth)acrylamide, dibutylaminoethyl (meth)acrylamide, dibutylaminopropyl(meth)acrylamide, dibutylaminobutyl(meth)acrylamide, dihexylaminoethyl (meth)acrylamide, dihexylaminopropyl(meth)acrylamide and dioctylaminopropyl(meth)acrylamide. Of these, dimethylaminopropyl(meth)acrylamide, diethylaminopropyl(meth)acrylamide and dioctylaminopropyl(meth)acrylamide are preferred.

Examples of the N-disubstituted amino-aromatic vinyl compounds include styrene derivative such as dimethylaminoethylstyrene, diethylaminoethylstyrene, dipropylaminoethylstyrene and dioctylaminoethylstyrene.

Examples of the pyridyl group-containing vinyl compounds include 2-vinylpyridine, 4-vinylpyridine, 5-methyl-2-vinylpyridine and 5-ethyl-2-vinylpyridine. Of these, 2-vinylpyridine and 4-vinylpyridine are preferred.

The amino group-containing diene copolymer rubber may contain various kinds of monoolefinic monomer units other than the above-described monomer units as needed. Examples of the monoolefinic monomers include acrylic or methacrylic esters such as methyl acrylate, methyl methacrylate, ethyl acrylate, 2-ethylhexyl acrylate, 2-ethylhexyl methacrylate, hydroxyethyl acrylate and hydroxyethyl methacrylate; acrolein, vinyl chloride and vinyl acetate. These monoolefinic monomers may be used within limits not impeding the properties of the amino group-containing diene copolymer rubber. However, it may be generally contained in a range of 0–30 wt. % based on the whole monomer unit.

In the present invention, no particular limitation is imposed on the polymerization process for the amino group-containing diene copolymer rubber. Examples thereof include suspension polymerization, bulk polymerization and emulsion polymerization processes using a radical generator. The emulsion polymerization process is preferred.

As the emulsion polymerization process, it is only necessary to use a usual emulsion polymerization technique. An example thereof include a process in which predetermined amounts of the respective monomers are emulsified and dispersed in an aqueous medium in the presence of an emulsifier, and emulsion polymerization is conducted with a radical polymerization initiator.

As the emulsifier, for example, a salt of a long-chain fatty acid having at least 10 carbon atoms or a rosinate is used. Specific examples thereof include potassium and sodium salts of capric acid, lauric acid, myristic acid, palmitic acid, oleic acid, stearic acid and the like.

Examples of the radical polymerization initiator used include persulfates such as ammonium persulfate and potassium persulfate; and redox initiators such as a combination of ammonium persulfate and ferric sulfate and a combination of hydrogen peroxide and ferric sulfate.

A chain transfer agent may also be added for regulating the molecular weight of the resulting copolymer. Examples of the chain transfer agent used include mercaptans such as t-dodecyl mercaptan and n-dodecyl mercaptan, carbon tetrachloride, thioglycolic acid, α-methylstyrene dimer, diterpene, terpinolene and γ-terpinene.

The temperature of the emulsion polymerization may be suitably selected according to the kind of the radical polymerization initiator used. The temperature is generally 0–100° C., preferably 0–60° C. Either style of continuous polymerization or batch polymerization may be used as a polymerization style.

If a conversion upon the emulsion polymerization becomes higher, the resulting copolymer shows a tendency to gel. Therefore, the conversion upon the polymerization is preferably controlled to 80% or lower. It is particularly preferable to terminate the polymerization at the time the reaction has reached a conversion within a range of 40–70%. The termination of the polymerization reaction is generally performed by adding a polymerization terminator to the polymerization system at the time the reaction has reached a predetermined conversion. For example, an amine compound such as diethylhydroxylamine or hydroxylamine, a quinone compound such as hydroquinone or benzoquinone, sodium nitrite, or sodium dithiocarbamate is used as the polymerization terminator.

After terminating the emulsion polymerization reaction, unreacted monomers are removed from the resultant polymer latex as needed, and an acid such as nitric acid or sulfuric acid is then added and mixed to adjust the pH of the latex to a predetermined value. Thereafter, a salt such as sodium chloride, calcium chloride or potassium chloride is added and mixed as a coagulant to coagulate the polymer as crumbs. The crumbs are washed, dehydrated and then dried by a band drier or the like, whereby the intended amino group-containing diene copolymer rubber can be obtained.

The amino group-containing diene copolymer rubbers may be used either singly or in any combination thereof.
Another diene rubber (B):

The amino group-containing diene copolymer rubber (A) may be used singly as the diene rubber component, but may be used in combination with another diene rubber (B). When used in combination with another diene rubber (B), a proportion of the amino group-containing diene copolymer rubber (A) in the diene rubber component is suitably selected according to the application and purpose of the resulting diene rubber composition. However, the amino group-containing diene copolymer rubber is used in a proportion of at least 10 wt. %, preferably, within a range of 20–90 wt. %, more preferably, within a range of 30–80 wt. %. Namely, a ratio (by weight) of the diene copolymer rubber (A) to another diene rubber (B) is 10:90 to 100:0, preferably 20:80 to 90:10, more preferably 30:70 to 80:20. If the proportion of the amino group-containing diene copolymer rubber (A) used is too low, it is difficult to achieve a sufficient improving effect.

Examples of another diene rubber (B) include natural rubber (NR), polyisoprene rubber (IR), emulsion-polymerized styrene-butadiene copolymer rubber (SBR), solution-polymerized random SBR (bound styrene: 5–50 wt. %; 1,2-bond content of butadiene unit moiety: 10–80%), high-trans SBR (1,4-trans content of butadiene moiety: 70–95%), low-cis polybutadiene rubber (BR), high-cis BR, high-trans BR (1,4-trans content of butadiene moiety: 70–95%), styrene-isoprene copolymer rubber (SIR), butadiene-isoprene copolymer rubber, solution-polymerized random styrene-butadiene-isoprene terpolymer rubber (SIBR), emulsion-polymerized SIBR, emulsion-polymerized styrene-acrylonitrile-butadiene terpolymer rubber, acrylonitrile-butadiene copolymer rubber, high-vinyl SBR-low-vinyl SBR block copolymer rubber, and block copolymers such as polystyrene-polybutadiene-polystyrene block copolymers. The diene rubber may be suitably selected from among these diene rubbers according to properties required. These diene rubbers may be used either singly or in any combination thereof. Among these, NR, BR, IR, SBR and SIBR are preferred. NR and IR are particularly preferred from the viewpoint of processability.

When another diene rubber (B) is used in combination, the tensile strength, heat build-up resistance, abrasion resistance and processability of the resulting diene rubber composition can be balanced at a high level. Specific examples of the combined system include (1) a combined system composed of the amino group-containing diene copolymer rubber (A) and [NR and/or IR] at a weight ratio of 20:80 to 90:10, preferably 30:70 to 20:80; and (2) a combined system composed of the amino group-containing diene copolymer rubber (A) and BR at a weight ratio of 20:80 to 90:10, preferably 30:70 to 20:80, or a combined system composed of the amino group-containing diene copolymer rubber (A), [NR and/or IR] and SBR at a weight ratio of 80–20:10–70:10–70.

Silica:

In the present invention, silica having a specific surface area of 50–220 m$^2$/g as determined by nitrogen absorption (BET method) is used as a reinforcing agent. Kinds of silica include dry process white carbon, wet process white carbon, colloidal silica and precipitated silica. Of these, wet process white carbon comprising hydrous silicic acid as a main component is preferred. Silica lying in an acid region is preferred from the viewpoint of dispersibility in the diene rubber component. Silica surface-treated with a coupling agent or the like may also be used.

The specific surface area of the silica as determined by nitrogen absorption is a value determined by the BET method in accordance with ASTM D 3037-81. The specific surface area of the silica used in the present invention as determined by nitrogen absorption (BET method) is within a range of 50–220 m$^2$/g, preferably 80–200 m$^2$/g, more preferably 120–190 m$^2$/g. If the specific surface area is too small, its reinforcing ability becomes poor. On the other hand, any specific surface area too large results in a diene rubber composition deteriorated in processability and not sufficiently improved in abrasion resistance and rebound resilience.

A compounding proportion of the silica is 10–150 parts by weight, preferably 20–120 parts by weight, more preferably 40–80 parts by weight, per 100 parts by weight of the diene rubber component. If the compounding proportion of the silica is too low, its reinforcing ability is not sufficiently exhibited. On the other hand, any proportion too high results in an unvulcanized rubber compound having an increased viscosity and hence deteriorated processability.

Silane coupling agent:

When a silane coupling agent is added to the diene rubber composition according to the present invention, the effects of improving heat build-up resistance and abrasion resistance become more marked.

No particular limitation is imposed on the silane coupling agent. However, examples thereof include vinyltrichlorosilane, vinyltriethoxysilane, vinyltris(β- methoxy-ethoxy)silane, β-(3,4-epoxycyclohexyl)-ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropylmethoxysilane, γ-aminopropyltriethoxysilane, bis(3-(triethoxysilyl)propyl) tetrasulfide, γ-trimethoxysilylpropyldimethylthiocarbamyl tetrasulfide and γ-trimethoxysilylpropylbenzothiazyl tetrasulfide.

A proportion of the silane coupling agent used is generally within a range of 2–10 parts by weight, per 100 parts by weight of the silica.

Diene rubber composition:

The diene rubber compositions according to the present invention can be obtained by kneading the individual components in accordance with a method known per se in the art. In addition to the above-described components, the diene rubber compositions according to the present invention may contain necessary amounts of other compounding agents such as vulcanizing agents, vulcanization accelerators, vulcanization aids, antioxidants, plasticizers, lubricants and fillers in accordance with a method known per se in the art.

Other compounding agents include those commonly used in a rubber industry, for example, vulcanizing agents such as sulfur and peroxides; vulcanization accelerators such as thiazole, thiuram, sulfenamide and guanidine types; vulcanization aides such as stearic acid and zinc white; activators such as diethylene glycol, polyethylene glycol and silicone oil; reinforcing agents, such as various grades of carbon black such as FEF, HAF, ISAF, SAF, furnace black, thermal black, acetylene black, channel black and graphite, and calcium carbonate; fillers such as clay and talc; and plasticizers, antioxidants and process oils. Necessary compounding agents may be suitably selected from among these various compounding agents according to the purposes and applications of the resulting diene rubber compositions.

When the individual components are kneaded, the diene rubber component and silica are first mixed by means of a mixer such as a roll or Banbury, and the other compounding agents are then added and mixed, whereby a diene rubber composition further improved in dispersibility and having far excellent properties can be provided. In this case, the addition of silica may be conducted in a lot. However, when a predetermined amount of the silica is added in preferably two or more portions, the silica can be easily dispersed, so that the silica can be more easily mixed with the diene rubber component. For example, 10–90 wt. % of the whole amount of the silica may be added on the first time, and the remainder may be added on and after the second time.

Although the silane coupling agent and activator among the other compounding agents may be added upon the first mixing of the rubber component with the silica, other additives may preferably be added on and after the subsequent step. When other additives than the silane coupling agent and activator are added upon the first mixing of the rubber component with the silica, in some cases, the mixing time may be lengthened, and the reinforcing ability of the silica may be lowered.

The temperature at which the diene rubber component and silica are mixed is generally 80–200° C., preferably 100–190° C., more preferably 140–180° C. If the temperature is too low, the abrasion property is not very improved. If the temperature is too high on the other hand, burning of the rubber component occurs. Therefore, both too low and too high mixing temperatures are not preferred. The mixing is generally conducted for at least 30 seconds, preferably 1–30 minutes.

EXAMPLES

The present invention will hereinafter be described specifically by the following Examples and Comparative Examples. Incidentally, all designations of "part" or "parts" and "%" as will be used in these examples mean part or parts by weight and wt. % unless expressly noted.

Various properties and compositional ratios of polymers were determined in accordance with the following respective methods:

(1) Bound styrene in each copolymer sample was determined in accordance with JIS K 6383 (refractive index method).

(2) A content of an amino group-containing monomer in each copolymer sample was determined by dissolving the copolymer in tetrahydrofuran, subjecting the solution to reprecipitation and coagulation twice with methanol/acetone (50/50 mol %), drying crumbs formed under reduced pressure and then measuring the content by $^1$H-NMR (500 MHz).

(3) Mooney viscosity ($ML_{1+4}$, 100° C.) was measured in accordance with JIS K 6301.

(4) Tensile strength was determined in accordance with JIS K 6301.

(5) Heat build-up resistance was determined by measuring tan 6 at 0.5% torsion, 20 Hz and 60° C. by means of an RDA-II manufactured by Rheometric Co. This property was expressed in terms of an index (tan 6 index at 60° C.).

(6) Abrasion resistance was determined by means of a Pico abrasion tester in accordance with ASTM D 2228. This property is expressed in terms of an index (Pico abrasion index).

(7) Processability was determined by observing winding tendency of an unvulcanized rubber composition sample on a roll, and evaluated in accordance with the following standard:

◎: Wound closely;

○: Wound, but slightly rose to the surface of the roll;

Δ: Wound, but frequently rose to the surface of the roll;

X: Scarcely wound.

Preparation Example 1

Tanks equipped with a stirrer was charged with 200 parts of water, 4 parts of a mixed soap of fatty acid/rosin acid, 0.2 parts of t-dodecyl mercaptan and respective monomers of their corresponding compositions shown in Table 1. The temperature of each reactor was controlled to 5° C., and 0.1 parts of cumene hydroperoxide, 0.2 parts of sodium formaldehyde sulfoxylate and 0.01 parts of ferric sulfate were added as a radical polymerization initiator to initiate polymerization. At the time a conversion reached 60%, diethylhydroxylamine was added to terminate the reaction. Unreacted monomers were recovered, and a polymer formed was coagulated with sulfuric acid and sodium chloride into crumbs. After the crumbs were dried by a crumb drier, thereby obtaining Diene Rubber Nos. 1 to 11. The kinds and proportions of the respective monomers used, and properties of the resultant polymers are shown in Table 1.

TABLE 1

| Diene Rubber No. | 1 | 2 | 3 | 4 | 5 | 6 | 7 | 8 | 9 | 10 | 11 |
|---|---|---|---|---|---|---|---|---|---|---|---|
| Charged amount (parts) | | | | | | | | | | | |
| Butadiene | 53 | 52 | 55 | 70 | 70 | 70 | 70 | 70 | 73 | 75 | 70 |
| Styrene | 43 | 44 | 42.5 | 29 | 29.7 | 29 | 29.2 | 28.5 | 20 | — | 30 |
| AAM (*1) | 4 | — | — | — | — | — | — | — | — | — | — |
| AST (*2) | — | 4 | — | — | — | — | — | — | — | — | — |
| DM (*3) | — | — | 2.5 | — | — | — | — | — | — | — | — |
| DMAST (*4) | — | — | — | 1 | — | — | — | — | — | — | — |
| DMAPAA (*5) | — | — | — | — | 0.3 | 1 | — | — | — | — | — |
| 4VP (*6) | — | — | — | — | — | — | 0.8 | 1.5 | — | — | — |
| 2VP (*7) | — | — | — | — | — | — | — | — | 7 | 25 | — |
| Bound amount (wt. %) | | | | | | | | | | | |
| Styrene | 33.2 | 32.2 | 33.3 | 21.8 | 22.1 | 21.9 | 21.6 | 20.8 | 15.2 | — | 22.6 |
| Amino group-containing monomer | 3.2 | 3.1 | 3.1 | 0.8 | 0.2 | 0.7 | 0.7 | 1.4 | 7.3 | 24.3 | — |
| Mooney viscosity ($ML_{1+4}$, 100° C.) | 46 | 47 | 49 | 53 | 52 | 50 | 51 | 49 | 48 | 46 | 54 |

(*1) Acrylamide (primary amino group-containing monomer)
(*2) Anilinostyrene (secondary amino group-containing monomer)
(*3) Dimethylaminoethyl methacrylate (tertiary amino group-containing monomer)
(*4) Dimethylaminostyrene (tertiary amino group-containing monomer)
(*5) Dimethylaminopropylacrylamide (tertiary amino group-containing monomer)
(*6) 4-Vinylpyridine (tertiary amino group-containing monomer)
(*7) 2-Vinylpyridine (tertiary amino group-containing monomer)

Examples 1–4, Comparative Examples 1–6

Diene Rubbers Nos. 8 and 11 prepared in Preparation Example 1 were separately used as raw rubber. On the basis of the compounding recipe shown in Table 2, the whole amount of the raw rubber, a half amount of the silica, a half amount of a silane coupling agent and a half amount of diethylene glycol as an activator were mixed with each other at 170° C. for 2 minutes in a 250-ml Brabender mixer, and the remaining compounding agents except for sulfur and a vulcanization accelerator were added to knead the mixture further for 2.5 minuets at the same temperature. The kinds of the diene rubber and silica are shown in Table 3.

The mixture thus obtained, sulfur and the vulcanization accelerator were then added to an open roll controlled at 50° C. to knead them. The kneaded mixture was then press-vulcanized at 160° C. for 30 minutes to produce test pieces, thereby determining their various physical properties. The results are shown in Table 3.

TABLE 2

| Mixing | First | Second | Third |
|---|---|---|---|
| Raw rubber | 100 | — | — |
| Silica | Half | Half | — |
| Silane coupling agent (*1) | Half | Half | — |
| Diethylene glycol | — | — | — |
| Zinc white | — | 3 | — |
| Stearic acid | — | 2 | — |
| Aromatic oil | — | 10 | — |
| Antioxidant (*2) | — | 1 | — |
| Vulcanization accelerator (*3) | — | — | Varied amount |
| Sulfur | — | — | 1.8 |

(*1) Si69 produced by Degussa AG.
(*2) Nocrac 6C produced by Ouchi-Shinko Chemical Industrial Co., Ltd.
(*3) Nocceler CZ produced by Ouchi-Shinko Chemical Industrial Co., Ltd.

TABLE 3

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Diene Rubber No. 8 | (parts) | 100 | 100 | 100 | 100 | 100 | — | — | — | — | — |
| Diene Rubber No. 11 | (parts) | — | — | — | — | — | 100 | 100 | 100 | 100 | 100 |
| Silica No. (1) | (parts) | 45 | — | — | — | — | 45 | — | — | — | — |
| Silica No. (2) | (parts) | — | 45 | — | — | — | — | 45 | — | — | — |
| Silica No. (3) | (parts) | — | — | 45 | — | — | — | — | 45 | — | — |
| Silica No. (4) | (parts) | — | — | — | 45 | — | — | — | — | 45 | — |
| Silica No. (5) | (parts) | — | — | — | — | 45 | — | — | — | — | 45 |
| Silane coupling agent (parts) | | 1.4 | 2.1 | 3.0 | 3.4 | 4.0 | 1.4 | 2.1 | 3.0 | 3.4 | 4.0 |
| Vulcanization accelerator (parts) | | 1.0 | 1.4 | 2.0 | 2.2 | 2.7 | 1.0 | 1.4 | 2.0 | 2.2 | 2.7 |
| Tensile strength (Kgf/cm$^2$) | | 228 | 229 | 229 | 223 | 218 | 226 | 228 | 223 | 219 | 213 |
| tan δ index at 60° C. (*1) | | 126 | 121 | 114 | 112 | 109 | 107 | 103 | 100 | 98 | 97 |

TABLE 3-continued

|  | Example | | | | Comparative Example | | | | | |
|---|---|---|---|---|---|---|---|---|---|---|
|  | 1 | 2 | 3 | 4 | 1 | 2 | 3 | 4 | 5 | 6 |
| Pico abrasion index (*1) | 98 | 105 | 109 | 105 | 97 | 93 | 95 | 100 | 96 | 93 |
| Compound $ML_{1+4}$, 100° C. | 53 | 56 | 94 | 99 | 115 | 53 | 54 | 72 | 90 | 102 |
| Processability on roll | ⊚ | ⊚ | ○ | ○ | x | ⊚ | ⊚ | ⊚ | ○ | ○ |

(Note)
Silica No. (1): Nipsil RS150 (product of Nippon Silica Industrial Co., Ltd.; 80 m²/g)
Silica No. (2): Ultrasil VN2G (product of Degussa AG; 125 m²/g)
Silica No. (3): Ultrasil VN3G (product of Degussa AG; 175 m²/g)
Silica No. (4): Nipsil AQ (product of Nippon Silica Industrial Co., Ltd.; 200 m²/g)
Silica No. (5): Nipsil VN3 (product of Nippon Silica Industrial Co., Ltd.; 240 m²/g)
(*1) Expressed in terms of an index assuming that the value of Comparative Example 4 is 100.

As apparent from Table 3, it is understood that the rubber compositions (Examples 1–4) according to the present invention have excellent processability on roll without increasing their compound viscosities, and are improved in tensile strength, heat build-up resistance and abrasion resistance. On the other hand, it is understood that when silica having a great specific surface area measured by nitrogen absorption is used (Comparative Example 1), the resultant diene rubber composition is somewhat improved in heat build-up resistance and abrasion resistance, but the compound has an extremely high Mooney viscosity (Compound $ML_{1+4}$, 100° C.), the diene rubber composition has poor processability and tensile strength and is scarcely improved in heat build-up resistance and abrasion resistance. It is also understood that the use of the diene rubber containing no amino group results in diene rubber compositions having no sufficient heat build-up resistance (Comparative Examples 2–6).

Examples 5–11, Comparative Example 7

The amino group-containing diene copolymer rubbers prepared in Preparation Example 1 and different in the kinds or contents of amino groups from each other, were separately used to evaluate the resulting diene rubber compositions in the same manner as in Example 3. The results of the evaluation are shown in Table 4.

TABLE 4

|  |  | Example | | | | | | | Comp. Ex. |
|---|---|---|---|---|---|---|---|---|---|
|  |  | 5 | 6 | 7 | 8 | 9 | 10 | 11 | 7 |
| Diene Rubber No. 1 | (parts) | 100 | — | — | — | — | — | — | — |
| Diene Rubber No. 2 | (parts) | — | 100 | — | — | — | — | — | — |
| Diene Rubber No. 3 | (parts) | — | — | 100 | — | — | — | — | — |
| Diene Rubber No. 4 | (parts) | — | — | — | 100 | — | — | — | — |
| Diene Rubber No. 5 | (parts) | — | — | — | — | 100 | — | — | — |
| Diene Rubber No. 6 | (parts) | — | — | — | — | — | 100 | — | — |
| Diene Rubber No. 7 | (parts) | — | — | — | — | — | — | 100 | — |
| Diene Rubber No. 10 | (parts) | — | — | — | — | — | — | — | 100 |
| Silica No. (3) | (parts) | 45 | 45 | 45 | 45 | 45 | 45 | 45 | 45 |
| Silane coupling agent (parts) |  | 3 | 3 | 3 | 3 | 3 | 3 | 3 | 3 |
| Vulcanization accelerator (parts) |  | 2 | 2 | 2 | 2 | 2 | 2 | 2 | 2 |
| Tensile strength (Kgf/cm²) |  | 246 | 256 | 252 | 248 | 239 | 229 | 224 | 162 |
| Elongation (%) |  | 530 | 550 | 530 | 510 | 510 | 470 | 450 | 310 |
| Stress at 300% (Kgf/cm²) |  | 116 | 128 | 135 | 108 | 98 | 113 | 118 | 156 |
| tan δ index at 60° C. (*1) |  | 100 | 102 | 105 | 105 | 103 | 108 | 110 | 100 |
| Pico abrasion index (*1) |  | 104 | 108 | 114 | 118 | 116 | 120 | 123 | 100 |
| Compound $ML_{1+4}$, 100° C. |  | 56 | 57 | 57 | 80 | 71 | 84 | 86 | 135 |
| Processability on roll |  | ⊚ | ⊚ | ⊚ | ○ | ○ | ○ | ○ | x |

(*1) Expressed in terms of an index assuming that the value of Comparative Example 7 is 100.

It is understood from the results shown in Table 4 that the diene rubber compositions (Examples 5–11) according to the present invention have excellent processability and good tensile strength, heat build-up resistance and abrasion resistance, and that in particular, the diene rubber compositions (Examples 7–11) each comprising their corresponding tertiary amino group-containing diene copolymer rubbers are improved in heat build-up resistance and abrasion resistance at a high level. On the other hand, it is understood that when the diene copolymer rubber having a higher amino group content is used (Comparative Example 7), the compound had an extremely high Mooney viscosity (Compound $ML_{1+4}$, 100° C.), and the resultant diene rubber composition has poor processability and tensile strength and is scarcely improved in heat build-up resistance and abrasion resistance.

Examples 12–15, Comparative Examples 8–11

One of the diene rubbers prepared in Preparation Example 1 was blended with natural rubber or polybutadiene (BR1220; product of Nippon Zeon Co., Ltd.) to separately use the resultant blends as raw rubber, thereby evaluating the resultant diene rubber compositions in the same manner as in Example 3. The compositions of the raw rubbers and the results of the evaluation are shown in Table 5.

viscosity ($ML_{1+4}$, 100° C.) of 30–150, and 0–90 wt. % of another diene rubber (B), 10–150 parts by weight of silica having a specific surface area of 50–220 $m^2/g$ as determined by nitrogen absorption (BET method), and a silane coupling

TABLE 5

|  |  | Example | | | | Comparative Example | | | |
| --- | --- | --- | --- | --- | --- | --- | --- | --- | --- |
|  |  | 12 | 13 | 14 | 15 | 8 | 9 | 10 | 11 |
| Diene Rubber No. 8 | (parts) | 80 | 60 | — | 80 | — | — | — | — |
| Diene Rubber No. 9 | (parts) | — | — | 30 | — | — | — | — | — |
| Diene Rubber No. 11 | (parts) | — | — | — | — | 80 | 60 | 30 | 80 |
| Natural rubber | (parts) | 20 | 40 | 70 | — | 20 | 40 | 70 | — |
| BR | (parts) | — | — | — | 20 | — | — | — | 20 |
| Silica No. (3) | (parts) | 45 | 45 | 45 | 45 | 45 | 45 | 45 | 45 |
| Silane coupling agent (parts) |  | 3 | 3 | 3 | 3 | 3 | 3 | 3 | 3 |
| Vulcanization accelerator (parts) |  | 2 | 2 | 2 | 2 | 2 | 2 | 2 | 2 |
| Tensile strength ($Kgf/cm^2$) |  | 207 | 218 | 240 | 199 | 250 | 257 | 235 | 213 |
| tan δ index at 60° C. (*1) |  | 115 | 118 | 113 | 115 | 100 | 102 | 102 | 100 |
| Pico abrasion index (*1) |  | 113 | 117 | 134 | 114 | 96 | 98 | 93 | 100 |
| Compound $ML_{1+4}$, 100° C. |  | 92 | 87 | 75 | 91 | 69 | 66 | 53 | 81 |
| Processability on roll |  | ⊚ | ⊚ | ⊚ | ○ | ○ | ⊚ | ⊚ | Δ |

(*1) Expressed in terms of an index assuming that the value of Comparative Example 11 is 100.

It is understood from the results shown in Table 5 that the tensile strength, heat build-up resistance, abrasion resistance and processability on roll of the diene rubber compositions (Examples 12–15) according to the present invention are balanced at a high level. On the other hand, when the diene rubber containing no amino group is used (Comparative Examples 8–11), the resultant diene rubber compositions are insufficient in heat build-up resistance and abrasion resistance.

INDUSTRIAL APPLICABILITY

According to the present invention, processability, which has hitherto been a weak point of silica-compounded rubber materials, can be improved without impairing good heat build-up resistance which constitutes a feature of such rubber materials. Further, tensile strength and abrasion resistance can be greatly improved. The diene rubber compositions according to the present invention can be used in various fields of applications, for example, various parts for tires, such as treads, carcasses, sidewalls and beads; rubber products such as hoses, window frames, belts, shoe soles, rubber vibration insulators and automobile parts; and further toughening rubbers for resins such as impact-resistant polystyrene and ABS resins, making good use of their excellent properties.

Although the diene rubber compositions according to the present invention are excellently suitable for use, in particular, as rubber materials for tire treads of fuel consumption-reducing tires, they are also suitable for use as rubber materials for tire treads, sidewalls, under treads, carcasses, beads and the like of all-season tires, high performance tires, studless tires, etc.

What is claimed is:

1. A diene rubber composition comprising 100 parts by weight of a diene rubber component composed of 10–100 wt. % of an amino group-containing diene copolymer rubber (A) having a composition (based on the bound amount) of 40–99.95 wt. % of a conjugated diene monomer, 0.05–20 wt. % of an amino group-containing vinyl monomer and 0–55% wt. % of an aromatic vinyl monomer and having a Mooney viscosity ($ML_{1+4}$, 100° C.) of 30–150, and 0–90 wt. % of another diene rubber (B), 10–150 parts by weight of silica having a specific surface area of 50–220 $m^2/g$ as determined by nitrogen absorption (BET method), and a silane coupling agent in a proportion of 2–10 parts by weight per 100 parts by weight of the silica.

2. The diene rubber composition according to claim 1, wherein the conjugated diene monomer is 1,3-butadiene or 2-methyl-1,3-butadiene.

3. The diene rubber composition according to claim 1, wherein the aromatic vinyl monomer is styrene.

4. The diene rubber composition according to claim 1, wherein the amino group-containing diene copolymer rubber has a tertiary amino group as the amino group.

5. The diene rubber composition according to claim 1, wherein the amino group-containing vinyl monomer is at least one selected from among aminoalkyl acrylates, aminoalkylacrylamines, amino-aromatic vinyl compounds and vinyl compounds having a nitrogen-containing heterocycle.

6. The diene rubber composition according to claim 1, wherein the amino group-containing vinyl monomer is a tertiary amino group-containing vinyl monomer.

7. The diene rubber composition according to claim 1, wherein the tertiary amino group-containing vinyl monomer is at least one selected from among N-disubstituted aminoalkyl acrylate, N-disubstituted aminoalkylacrylamide, N-disubstituted amino-aromatic vinyl compounds a nd pyridyl group-containing vinyl compounds.

8. The diene rubber composition according to claim 1, wherein another diene rubber (B) is at least one selected from among natural rubber, polybutadiene rubber, polyisoprene rubber, styrene-butadiene copolymer rubber and styrene-isoprene-butadiene terpolymer rubber.

9. The diene rubber composition according to claim 1, wherein the rubber component comprises the amino group-containing diene copolymer rubber (A) and another diene rubber (B) at a ratio (by weight) of 20:80 to 90:10.

10. The diene rubber composition according to claim 1, wherein the specific surface area of the silica as determined by nitrogen absorption (BET method) is within a range of 80–200 $m^2/g$.

11. The diene rubber composition according to claim 1, wherein the silica is compounded in a proportion of 20–120 parts by weight per 100 parts by weight of the diene rubber component.

12. The diene rubber composition according to claim 11, wherein the silica is compounded in a proportion of 40–80 parts by weight per 100 parts by weight of the diene rubber component.

13. The diene rubber composition according to claim 1, wherein the silica is at least one selected from among dry process white carbon, wet process white carbon, colloidal silica and precipitated silica.

14. A method for preparing a diene rubber composition, comprising compounding silica having a specific surface area of 50–220 m$^2$/g as determined by nitrogen absorption (BET method) in a proportion of 10–150 parts by weight per 100 parts by weight of a diene rubber component composed of 10–100 wt. % of an amino group-containing diene copolymer rubber (A) having a composition (based on the bounded amount) of 40–99.95 wt. % of a conjugated diene monomer, 0.05–20 wt. % of an amino group-containing vinyl monomer and 0–55 wt. % of an aromatic vinyl monomer and having a Mooney viscosity ($ML_{1+4}$, 100° C.) of 30–150, and 0–90 wt. % of another diene rubber (B), and a silane coupling agent in a proportion of 2–10 parts by weight per 100 parts by weight of the silica, wherein a whole amount of the silica to be compounded with the diene rubber component is added and mixed in at least two portions.

15. The method according to claim 14 for preparing the diene rubber composition, wherein 10 to 90% of the whole amount of the silica to be compounded with the diene rubber component is added and mixed on the first time, and the remainder, 90 to 10%, is added and mixed on and after the second time.

16. The method according to claim 15, for preparing the diene rubber composition, wherein other compounding agents are added and mixed upon the addition of silica on and after the second time.

17. The method according to claim 15, for preparing the diene rubber composition, wherein the mixing is conducted at a kneading temperature of 80–200° C.

18. The method according to claim 14, for preparing the diene rubber composition, wherein the mixing is conducted at a kneading temperature of 80–200° C.

19. The method according to claim 14, for preparing the diene rubber composition, wherein other compounding agents are added and mixed upon the addition of silica on and after the second time.

\* \* \* \* \*